US012717855B2

(12) United States Patent
Patwardhan

(10) Patent No.: US 12,717,855 B2
(45) Date of Patent: Aug. 25, 2026

(54) DATA MIGRATION OF SEARCH INDEXES ACROSS SEARCH-ENGINE DEPLOYMENTS

(71) Applicant: State Farm Mutual Automobile Insurance Company, Bloomington, IL (US)

(72) Inventor: Sandeep Patwardhan, Chandler, AZ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 341 days.

(21) Appl. No.: 17/667,672

(22) Filed: Feb. 9, 2022

(65) Prior Publication Data

US 2022/0277054 A1 Sep. 1, 2022

Related U.S. Application Data

(60) Provisional application No. 63/154,478, filed on Feb. 26, 2021.

(51) Int. Cl.

*G06F 16/9532* (2019.01)
*G06F 16/21* (2019.01)
*G06F 16/28* (2019.01)
*G06F 16/951* (2019.01)

(52) U.S. Cl.

CPC ........ *G06F 16/9532* (2019.01); *G06F 16/211* (2019.01); *G06F 16/285* (2019.01); *G06F 16/951* (2019.01)

(58) Field of Classification Search

CPC .. G06F 16/9532; G06F 16/285; G06F 16/211; G06F 16/951

See application file for complete search history.

(56) References Cited

U.S. PATENT DOCUMENTS

| | | | | |
|---|---|---|---|---|
| 5,974,409 | A * | 10/1999 | Sanu | G06F 16/951 |
| 6,336,117 | B1 | 1/2002 | Massarani | |
| 8,626,717 | B2 | 1/2014 | Bendakovsky et al. | |
| 10,031,978 | B1 | 7/2018 | Brette et al. | |
| 10,565,065 | B2 | 2/2020 | Guzik | |
| 10,838,821 | B2 | 11/2020 | Bhagi et al. | |
| 2004/0243717 | A1* | 12/2004 | Couchot | G06F 16/258 709/236 |
| 2008/0027971 | A1 | 1/2008 | Statchuk | |

(Continued)

*Primary Examiner* — Sherief Badawi
*Assistant Examiner* — Earl Levi Elias
(74) *Attorney, Agent, or Firm* — Lee & Hayes, P.C.

(57) ABSTRACT

Described herein are techniques to facilitate data migration by transferring data across search indexes of differing search-engine deployments. The techniques include obtaining a first search index of a first search-engine deployment and causing, by a backup tool of the first search-engine deployment, production of a backup of the first search index. The techniques also include causing the generation of a second search index on the second search-engine deployment. The techniques further include causing, by a backup tool of the second search-engine deployment, production of a backup of the second search index, and causing, by a restoration tool of the second SE deployment, restoration of the second search index using the backup of first search index on the second search-engine deployment.

20 Claims, 4 Drawing Sheets

(56) References Cited

U.S. PATENT DOCUMENTS

| | | | | |
|---|---|---|---|---|
| 2009/0204579 | A1* | 8/2009 | Govani | G06F 16/951 707/999.102 |
| 2011/0282839 | A1* | 11/2011 | Paksoy | G06F 16/2272 707/E17.007 |
| 2012/0254739 | A1* | 10/2012 | Dehmann | G06F 16/86 715/255 |
| 2015/0120695 | A1* | 4/2015 | Vasu | G06F 16/2228 707/711 |
| 2017/0219357 | A1* | 8/2017 | Pfeifle | G01C 21/3881 |
| 2017/0363707 | A1* | 12/2017 | Mateti | G06T 7/246 |
| 2018/0039656 | A1* | 2/2018 | McConnell | G06F 16/211 |
| 2018/0246945 | A1* | 8/2018 | Lee | G06F 16/27 |
| 2021/0279151 | A1* | 9/2021 | Sarkar | G06F 11/1469 |

* cited by examiner

DATA MIGRATION OF SEARCH INDEXES ACROSS SEARCH-ENGINE DEPLOYMENTS

PRIORITY

This application claims priority to U.S. provisional patent application 63/154,478, filed Feb. 26, 2021, which is incorporated herein by reference.

BACKGROUND

Historically, data migration of search indexes has required compatible search-engine deployments or manual reconfiguration in the case of incompatible computing platforms and data formats. A computing platform is an environment in which computing instructions are executed, data is stored in predefined formats, and relationships amongst computing components are defined.

Manual reconfiguration of incompatible data formats has traditionally involved selecting data, preparing the data, extracting the data, transforming the data, and transferring that transformed data from one computing platform to another. When the data formats of computing platforms across which data is to be migrated are incompatible, the typically manual reconfiguration and transferring of the data and its underlying structure is resource intensive and prone to introducing errors in the data.

Accordingly, there is an opportunity to improve data migration of search indexes across deployments of search-engines having incompatible formats.

SUMMARY

This disclosure describes systems, methods, and computer-executable instructions on computer-readable media, collectively referred to as "techniques" for efficiently migrating data across search indexes of incompatible search-engine deployments. For example, using the techniques described herein, a stand-alone search-engine deployment can migrate its otherwise incompatible search index to a cluster-based search-engine deployment using the native tools of the stand-alone search-engine deployment and/or the native tools of the cluster-based search-engine deployment.

In at least one example, a method includes obtaining a first search index associated with a first search-engine deployment; causing, by a backup tool associated with the first search-engine deployment, generation of a backup of the first search index; transferring the backup of the first search index to a second search-engine deployment; causing generation of a second search index to be a target search index on the second search-engine deployment, the second search index being empty; causing, by a backup tool associated with the second search-engine deployment, generation of a backup of the second search index; and causing, by a restoration tool associated with the second search-engine deployment, creation of a restored second search index using the backup of the first search index on the second search-engine deployment as a source search index for the restoration.

In at least one example, a system includes one or more processors; and a computer-readable medium coupled to the one or more processors, the computer-readable medium storing instructions that are executable by the one or more processors to perform operations including: obtaining a first search index associated with a first search-engine deployment; causing, by a backup tool associated with the first search-engine deployment, production of a backup of the first search index; transferring the backup of the first search index to a second search-engine deployment, wherein the format of the first search index is incompatible with format (s) supported by the second search-engine deployment; causing generation of a second search index to be a target search index on the second search-engine deployment, the second search index being empty; causing, by a backup tool of the second search-engine deployment, production of a backup of the second search index; and causing, by a restoration tool of the second search-engine deployment, creation of a restored second search index using the backup of the first search index on the second search-engine deployment as a source search index for the restoration.

In at least one example, one or more computer-readable media include instructions that, when executed by one or more processors of at least one device, configure at least one device to perform operations, the operations comprising: obtaining a first search index associated with a first search-engine deployment; determining a schema of data populating the first search index; transferring the schema to a second search-engine deployment as a transferred schema; causing, by a backup tool of the first search-engine deployment, production of a backup of the first search index; transferring the backup of the first search index to the second search-engine deployment, wherein the first search index is incompatible with the second search-engine deployment; causing generation of a second search index associated with the second search-engine deployment to be a target search index, wherein the second search index is empty and employs the transferred schema; causing, by a backup tool associated with the second search-engine deployment, production of a backup of the empty second search index; and causing, by a restoration tool associated with the second search-engine deployment, creation of a restored second search index using the backup of the first search index on the second search-engine deployment as a source search index for the restoration.

This Summary is provided to introduce a selection of concepts in a simplified form that are further described below in the Detailed Description. This Summary is not intended to identify key and/or essential features of the claimed subject matter, nor is it intended to be used as an aid in determining the scope of the claimed subject matter. The term "techniques," for instance, can refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is set forth with reference to the accompanying figures. In the figures, the left-most digit of a reference number identifies the figure in which the reference number first appears. The same reference numbers in different figures indicates similar and/or identical items.

DETAILED DESCRIPTION

Overview

Figure 1:
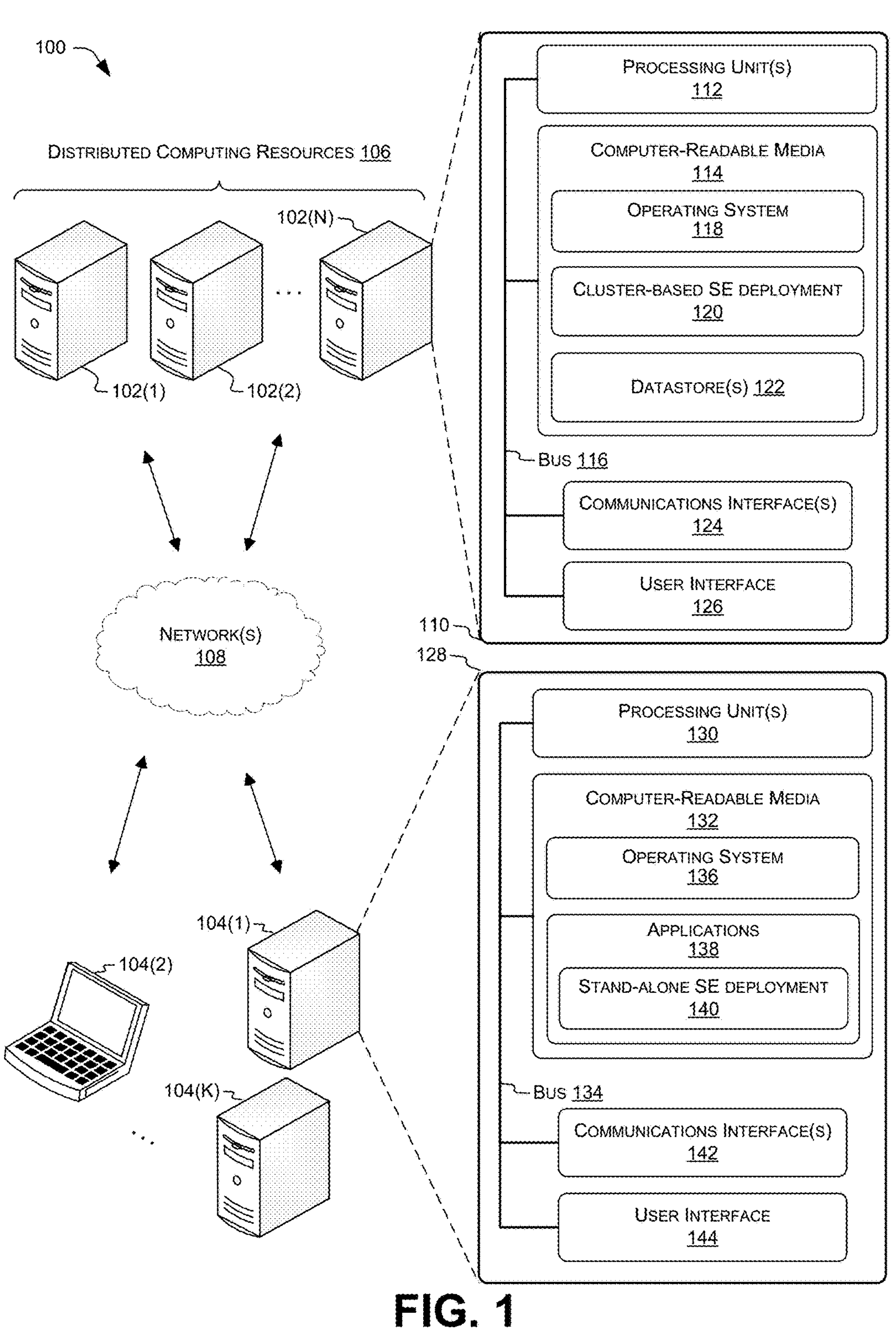
FIG. 1 is a block diagram depicting an example environment in which data migration of search indexes across search-engine deployments as described herein can be implemented.

Certain examples of the disclosure will now be described more fully below with reference to the accompanying figures, in which various aspects are shown. However, the various aspects may be implemented in many different forms and should not be construed as limited to the examples set forth herein. The disclosure encompasses variations of the examples described herein.

The ability and practicality of data migration is a consideration for any platform implementation, upgrade, or consolidation. Performing data migration in an automated way is often desired to reduce the costs of human resources performing tedious tasks of manual data migration as well as reducing human-introduced errors in the data. Data migration is desirable for a variety of reasons, including server or storage equipment replacements, server or storage equipment maintenance or upgrades, application migration, platform migration, website consolidation, disaster recovery, and/or data center relocation to name a few. Challenges arise when the data to be migrated is in incompatible formats and/or the structures of the computing platforms are incompatible. For example, the incompatible computing platforms may have different formats of their stored data objects (e.g., files).

Database migration is a particular type of data migration. In some instances, it may be desirable to move a database from one type of computing platform to another. In so doing, the data and its underlying structure or relationships need to be transferred from one computing platform to another. If the platforms are compatible, then the new platform may just use copies of the stored data objects because both use the same format or arrangements of its data. In cases where the platforms are incompatible, users have been forced to purchase a special-purpose data-migration tool, if one exists, to accomplish the transfer of the data and its underlying structure or relationships of the data objects between platforms.

Without a special-purpose data-migration tool, database migration from one computing platform to another is typically accomplished manually. For example, a human resource may manually reproduce the contents of a data field from the stored data object of one database computing platform to a commensurate data field in the stored data object of an incompatible database computing platform.

Data migration of search indexes across search-engine deployments as described herein can improve migration of data from stand-alone server implementations to incompatible cluster-based server implementations and/or can improve migration of data from cluster-based server implementations to incompatible stand-alone server implementations. Data migration of search indexes across search-engine deployments as described herein can make migration more efficient and less prone to errors than existing techniques. In at least one example, the Data migration of search indexes across search-engine deployments as described herein enables migration from a stand-alone APACHE™ SOLR™ search engine deployed on a stand-alone server to a cluster-based APACHE™ SOLR™ search engine deployed on cluster-based computing resources and/or from a cluster-based APACHE™ SOLR™ search engine deployed on cluster-based computing resources to a stand-alone APACHE™ SOLR™ search engine deployed on a stand-alone server using native tools of the stand-alone search-engine deployment and/or the cluster-based search-engine deployment.

APACHE™ SOLR™ is an open-source enterprise-search platform from the APACHE™ LUCENE™ project. The APACHE™ SOLR™ search engine takes in structured, semi-structured, and unstructured data from various sources, stores and indexes the data, and makes the data available for search. While aspects of this disclosure are described in the context of various deployments of an APACHE™ SOLR™ search engine, the data migration of search indexes across search-engine deployments may be used to migrate data in other contexts.

Illustrative Environment

FIG. 1 shows an example environment 100 in which examples of data migration of search indexes across search-engine deployments such as those described herein can be performed. The illustrated environment includes computing device(s) 102(1)-102(N) (individually and/or collectively referred to herein with reference 102), where N is any integer greater than and/or equal to 1. The computing device(s) 102 can include server(s) in a cloud or cluster-based deployment, for example. The illustrated environment also includes computing devices 104(1)-104(K) (individually and/or collectively referred to herein with reference 104), where K is any integer greater than and/or equal to 1. In some examples, N=K; in other examples, N>K or N<K. The computing devices 104 can include, for example, computer(s) operating as stand-alone server(s) in a stand-alone deployment. Computing device(s) 102 and/or 104 can include a diverse variety of device categories, classes, and/or types and are not limited to any of the particular types of devices illustrated.

In the illustrated example, computing device(s) 102(1)-102(N) can be computing nodes of distributed computing resources 106, e.g., in a computing cluster, such as a cloud service such as MICROSOFT™ AZURE™, VMWARE™ VCLOUD™, RACKSPACE™, Inc.'s OPENSTACK™, AMAZON™ WEB SERVICES (AWS™), IBM™ SMARTCLOUD™, ORACLE™ CLOUD™, etc. Computing devices 102(1)-102(N) in distributed computing resources 106 can share resources, balance load, increase performance, and/or provide fail-over support and/or redundancy, etc. In the illustrated example, data migration of search indexes across search-engine deployments can enable computing device(s) 104 in some instances to operate as clients of distributed computing resources 106 that can submit jobs to distributed computing resources 106 and/or receive job results from distributed computing resources 106.

By way of example and not limitation, computing device (s) 102 can include, but are not limited to, server computers and/or blade servers such as Web servers, map/reduce servers and/or other computation engines, and/or network-attached-storage units (e.g., 102(1)). By way of example and not limitation, computing device(s) 104 can include, but are not limited to, server computers and/or blade servers such as Web servers, map/reduce servers and/or other computation engines, and/or network-attached-storage units (e.g., 104(1)), laptop computers (e.g., 104(2)), desktop computers (e.g., 104(K)), and/or other telecommunication devices, desktop computers, and/or integrated components for inclusion in computing devices, appliances, and/or other computing device(s) configured to participate in and/or carry out data migration of search indexes across search-engine deployments as described herein.

In some examples, as indicated, computing device(s), e.g., computing devices 102 and 104, can intercommunicate to participate in and/or carry out data migration of search indexes across search-engine deployments as described herein. For example, a computing device 104 can include a stand-alone search-engine (SE) deployment and distributed computing resources 106 including computing devices 102 can host modules and/or components of a cluster-based SE deployment as described below with reference to, e.g., FIGS. 2-4.

In some examples, computing devices 102 and/or 104 can communicate with each other and/or with other computing devices via one or more network(s) 108. In some examples, computing devices 102 and 104 can communicate with external devices via network(s) 108. For example, network (s) 108 can include public networks such as the Internet, private networks such as an institutional and/or personal intranet, and/or combination(s) of private and public networks. Private networks can include networks connected to the Internet and/or other public network(s) via network address translation (NAT) devices, firewalls, network intrusion detection systems, and/or other devices that restrict and/or control the types of network packets permitted to flow between the private network and the public network(s).

Network(s) 108 can also include any type of wired and/or wireless network, including but not limited to local area networks (LANs), wide area networks (WANs), satellite networks, cable networks, Wi-Fi networks, WiMAX networks, mobile communications networks (e.g., 3G, 4G, 5G, and so forth), any combination thereof, etc. Network(s) 108 can utilize communications protocols, such as, for example, packet-based and/or datagram-based protocols such as Internet Protocol (IP), Transmission Control Protocol (TCP), User Datagram Protocol (UDP), other types of protocols, and/or combinations thereof. Moreover, network(s) 108 can also include a number of devices that facilitate network communications and/or form a hardware infrastructure for the networks, such as switches, routers, gateways, access points, firewalls, base stations, repeaters, backbone devices, and the like. Network(s) 108 can also include devices that facilitate communications between computing devices 102 and/or 104 using bus protocols of various topologies, e.g., crossbar switches, INFINIBAND switches, FIBRE CHANNEL switches and/or hubs, etc.

In some examples, network(s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and/or one or more other standards, e.g., BLUETOOTH, cellular-telephony standards such as code division multiple access (CDMA), global system for mobile communication (GSM), 3rd Generation Partnership Project (3GPP) standards, such as long-term evolution (LTE) and/or new radio (NR), voice over internet protocols (VOIP), worldwide interoperability for microwave access (WiMAX), etc.

Different networks have different characteristics, e.g., bandwidth, latency, accessibility (open, announced but secured, and/or not announced), and/or coverage area. The type of network 108 used for any given connection between, e.g., a computing device 104 and distributed computing resources 106 can be selected based on these characteristics and on the type of interaction.

Still referring to the example of FIG. 1, details of an example computing device 102(N) are illustrated at inset 110. The details of example computing device 102(N) can be representative of others of computing device(s) 102. However, each of the computing device(s) 102 can include additional or alternative hardware components and/or software modules.

Illustrated computing device 102 can include one or more processing unit(s) 112, e.g., integrated electronic circuit(s) operably connected to one or more computer-readable media 114, e.g., memories, such as via a bus 116. In some examples, a plurality of processing unit(s) 112 can exchange data through an internal interface bus (e.g., PCIe), rather than and/or in addition to network 108. While the processing unit(s) 112 are described as residing on the computing device 102(3), in this example, the processing unit(s) 112 can also reside on different computing device(s) 102 and/or 104 in some examples. In some examples, at least two of the processing unit(s) 112 can reside on different computing device(s) 102 and/or 104. In such examples, multiple processing unit(s) 112 on the same computing device 102 and/or 104 can use a bus 116 of the computing device 102 and/or 104 to exchange data, while processing unit(s) 112 on different computing device(s) 102 and/or 104 can exchange data via network(s) 108.

Processing unit(s) 112 can include one or more microprocessors, single-core processors, multi-core processors, CPUs, GPUs, GPGPUs, and/or hardware logic components configured, e.g., via specialized programming from modules and/or APIs, to perform functions described herein. For example, and without limitation, illustrative types of hardware logic components that can be used in and/or as processing unit(s) 112 include Field-Programmable Gate Arrays (FPGAs), Application-Specific Integrated Circuits (ASICs), Application-Specific Standard Products (ASSPs), System-on-a-Ship systems (SOCs), Complex Programmable Logic Devices (CPLDs), Digital Signal Processors (DSPs), and other types of customizable processors. For example, a processing unit 114 can represent a hybrid device, such as a device from ALTERA and/or XILINX that includes a CPU core embedded in an FPGA fabric. These and/or other hardware logic components can operate independently and/or, in some instances, can be driven by a CPU. In some examples, at least some of computing device(s) 102 and/or 104 can include a plurality of processing unit(s) 112 of multiple types. For example, the processing unit(s) 112 shown in computing device 102(N) can be a combination of one or more CPUs, GPGPUs, FPGAs, etc. Different processing unit(s) 112 can have different execution models, e.g., as is the case for graphics processing units (GPUs) and central processing unit (CPUs).

Computer-readable media described herein, e.g., computer-readable media 114, includes digital storage media also termed non-transitory computer-readable media, and/or communication media. Digital storage media includes tangible storage units such as volatile memory, nonvolatile memory, and/or other persistent and/or auxiliary computer storage media, removable and non-removable digital storage media implemented in any method and/or technology for storage of information such as computer-readable instructions, data structures, program modules, and/or other data. Digital storage media includes tangible and/or physical forms of media included in a device and/or hardware component that is part of a device and/or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards and/or other optical storage media, magnetic cassettes, magnetic tape, magnetic disk storage, magnetic cards and/or other magnetic storage devices and/or media, solid-state memory devices, storage arrays, network attached storage, storage area networks, hosted computer storage and/or memories, storage, devices, and/or storage media that can be used to store and maintain information for access by a computing device 102 and/or 104.

In contrast to digital storage media also termed non-transitory computer-readable media, communication media can embody computer-readable instructions, data structures, program modules, and/or other data in a modulated data signal, such as a carrier wave, and/or other transitory transmission mechanism. As defined herein, digital storage media does not include communication media.

In some examples, computer-readable media 114 can store instructions executable by the processing unit(s) 112 that, as discussed above, can represent a processing unit incorporated in computing device 102. Computer-readable media 114 can additionally and/or alternatively store instructions executable by external processing units such as by an external central processing unit (CPU) and/or external processor of any type discussed herein. In some examples at least one processing unit 112, e.g., a CPU, graphics processing unit (GPU), and/or hardware logic device, can be incorporated in computing device 102, while in some examples at least one processing unit 112, e.g., one or more of a CPU, GPU, and/or hardware logic device, can be external to computing device 102.

Computer-readable media 114 can store, for example, computer-executable instructions of programs, and/or applications that are loadable and executable by processing unit(s) 112 such as an operating system 118, and/or other modules. In various examples, computer-readable media 114 can store, computer-executable instructions of a cluster-based SE deployment module or component 120. Cluster-based SE deployment module or component 120 can include native tools particular to the data, schema, and format of the data of corresponding search indexes. In some examples not shown, one or more of the processing unit(s) 112 in one of the computing device(s) 102 and/or 104 can be operably connected to computer-readable media 114 in a different one of the computing device(s) 102 and/or 104, e.g., via communications interface and network 108. For example, the computer-executable instructions stored on the computer-readable media 114 can upon execution configure a computer such as a computing device 102 to perform operations described herein with reference to the operating system 118, and/or the cluster-based SE deployment module or component 120.

Computer-readable media 114 can also store, for example, one or more datastore(s) 122. Datastore(s) 122 can include multiple disparate databases or data sources. For example, the cluster-based SE deployment 120 and/or operating system 118 can store and/or access digital records, such as those associated with insurance policies, etc., in one or more datastore(s) 122. In at least one example, cluster-based SE deployment 120 and/or operating system 118 can perform data analysis and/or processing on input from the multiple disparate data sources such as computing device(s) 104.

Bus 116, which in some instances can include one or more of a system bus, a data bus, an address bus, a Peripheral Component Interconnect (PCI) Express (PCIe) bus, a PCI bus, a Mini-PCI bus, and any variety of local, peripheral, and/or independent buses, and/or any combination thereof can operably connect one or more processing unit(s) 112 to one or more computer-readable media 114.

Computing device 102 can also include one or more communications interfaces 124 connected via the bus 116 to processing unit(s) 112 to enable wired and/or wireless communications between computing device(s) 102 and other networked computing devices 102 and/or 104 involved in operations of a cluster-based SE deployment program 120, and/or other computing device(s), e.g., over network(s) 108. Such communications interface(s) 124 can include one or more transceiver devices, e.g., network interface controllers (NICs) such as Ethernet NICs and/or other types of transceiver devices, to send and receive communications over a network. The processing unit(s) 112 can exchange data through respective communications interface(s) 124. In some examples, the communications interface 124 can include a PCI Express (PCIe) transceiver, and the network 108 can include a PCIe bus. In some examples, the communications interface 124 can include, but is not limited to, a transceiver for cellular (3G, 4G, 5G, and/or other), WI-FI, Ultra-wideband (UWB), BLUETOOTH, and/or satellite transmissions. The communications interface 124 can include a wired I/O interface, such as an Ethernet interface, a serial interface, a Universal Serial Bus (USB) interface, an INFINIBAND interface, and/or other wired interfaces. The communications interface 124 can additionally and/or alternatively include one or more user-interface devices, buses such as memory buses and/or local buses, memory interfaces, and/or hardwired interfaces such as 0-20 mA control lines. For simplicity, these and other modules or components are omitted from the illustrated computing device 102(N).

As noted above, computer-readable media 114 of the computing device 102 can store an operating system 118. In some examples, an operating system is not used (commonly referred to as a "bare metal" configuration). In some examples, the operating system 118 can include modules or components that enable and/or direct the computing device 102 to receive data via various input interfaces (e.g., user controls, network and/or communications interfaces, memory devices, and/or sensors), and process the data using the processing unit(s) 112 to generate output. The operating system 118 can further include one or more modules or components that present the output (e.g., display an image on an electronic screen, store data in memory, and/or transmit data to another computing device). The operating system 118 can enable a developer or an engineer, to interact with the computing device 102 using a user interface 126. User interface(s) (UI)s described herein can include one or more of a graphical user interface (GUI), and audio user interface (AUI), and/or various other input/output interfaces generally referenced as UI including touch-input interfaces and the like. Additionally, the operating system 118 can include modules or components that perform various functions generally associated with an operating system, e.g., storage management and internal-device management.

In some examples, computing device 102 can include a user interface 126 configured to permit a developer or an engineer responsible for computing device 102(N), distributed computing resources 106, environment 100 and/or an application administrator, to operate the cluster-based SE deployment via associated modules and/or components to access the datastore(s) 122.

Details of an example computing device 104(1) are illustrated at inset 128. The details of example computing device 104(1) can be representative of others of computing device (s) 104. However, each of the computing device(s) 104 can include additional and/or alternative hardware and/or software components. Computing device 104(1) can include one or more processing unit(s) 130 operably connected to one or more computer-readable media 132, e.g., via a bus 134. Some examples of processing unit(s) 130 are discussed above with reference to processing unit(s) 112. Some examples of computer-readable media 132 are discussed above with reference to computer-readable media 114. For example, computer-readable media 132 can include one or more digital storage media or communications media. Some examples of bus 134 are discussed above with reference to bus 116.

Computer-readable media 132 can store, for example, computer-executable instructions of an operating system 136, and/or other modules, programs, and/or applications 138 that are loadable and executable by processing unit(s) 130. Other applications in applications 138 can be operable with a stand-alone SE deployment 140. Stand-alone SE deployment module or component 140 can include native tools particular to the data, schema, and format of the data of corresponding search indexes. Some examples of operating system 136 are discussed above with reference to inset 110.

In some examples, the computing device 104 can be configured to communicate with distributed computing resources 106 and/or computing device(s) 102 via a communications interface 142. A stand-alone SE deployment 140 on computing device 104 can perform techniques associated with data migration of search indexes across search-engine deployments. For example, the data, schema, and format of the data and search indexes associated with stand-alone SE deployment 140 may be incompatible with the data, schema, and format of the data and search indexes associated with cluster-based SE deployment 120, and vice-versa. Thus, the native tools particular to cluster-based SE deployment 120 and stand-alone SE deployment 140 may also be incompatible with the other's search indexes. However, data migration of search indexes across search-engine deployments as described herein can utilize the native tools of the two incompatible deployments to accomplish the data migration of their search indexes. For example, by initiating a copy of the backup of a search index of the stand-alone deployment to an individual server of the cluster of multiple servers on which a cluster-based search engine is deployed.

Computing device 104 can also include one or more communications interfaces 142 connected via the bus 134 to processing unit(s) 130 to enable wired and/or wireless communications between computing device(s) 104 distributed computing resources 106 and/or and other networked computing devices 102 and/or 104 involved in data migration of search indexes across search-engine deployments, and/or other computing device(s), over network(s) 108. Some examples are discussed above with reference to communications interface(s) 124.

Computing device 104 can include a user interface 144. For example, computing device 104(4) can provide user interface 144 to control and/or otherwise interact with a stand-alone SE deployment 144, distributed computing resources 106, and/or computing devices 102. For example, processing unit(s) 130 can receive inputs e.g., typed and/or spoken queries, selections, and/or other input actions associated with data migration via user interface 144 and transmit corresponding data via communications interface(s) 142 to computing device(s) 102.

User interfaces 126 and/or 144 can include one or more input devices, integral and/or peripheral to computing device 102 and/or 104. The input devices can be user-operable, and/or can be configured for input from other computing device 102 and/or 104. Examples of input devices can include, e.g., a keyboard, keypad, a mouse, a trackball, a pen sensor and/or smart pen, a light pen and/or light gun, a joystick controller, a voice input device such as a microphone, voice-recognition device, and/or speech-recognition device, a touch input device such as a touchscreen and/or a touch pad, a gestural and/or motion input device such as a depth camera, a grip sensor, an accelerometer, another haptic input, a visual input device such as one or more cameras and/or image sensors, a QR code or bar code scanner, and the like. User interfaces 126 and/or 144 can include one or more output devices configured for communication to a user and/or to another computing device 102 and/or 104. Output devices can be integral and/or peripheral to computing device 102 and/or 104. Examples of output devices can include a display, a printer, audio speakers, beepers, and/or other audio output devices, a vibration motor, linear vibrator, and/or other haptic output device, and the like.

In some examples, data can be migrated from a legacy stand-alone system, or other system, to a distributed, cloud, or cluster-based system at a point in time tied to an upcoming event such as retirement of a stand-alone server, as a backup, etc.

Illustrative Scenario

Figure 2:
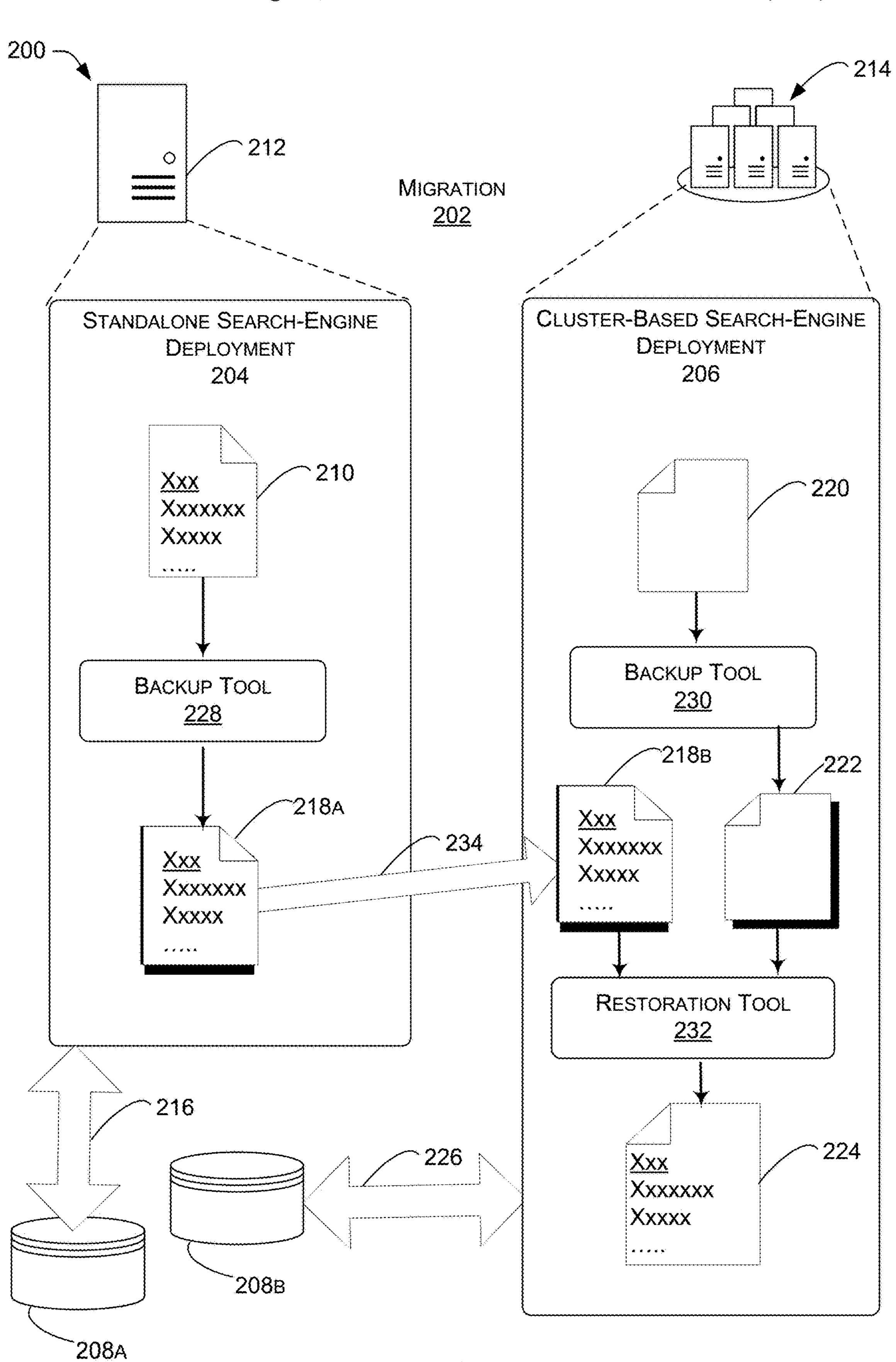
FIG. 2 schematically illustrates an example scenario involving a stand-alone search-engine deployment and a cluster-based search-engine deployment, in which the described techniques may operate in accordance with the technology described herein.

FIG. 2 schematically illustrates an example scenario 200 that facilitates data migration 202 by transferring data across incompatible search indexes of differing search-engine (SE) deployments. The example scenario 200 of migration 202 includes a stand-alone SE deployment 204, which in some examples can correspond to stand-alone SE deployment 140, a cluster-based SE deployment 206, which in some examples can correspond to cluster-based SE deployment 120, a database **208*a*, which in some examples can correspond to a datastore associated with stand-alone SE deployment 140, and a database 208*b*, which in some examples can correspond to datastore 122. Migration 202 of search indexes across search-engine deployments 204 and 206 as described herein can utilize the native tools of the two incompatible deployments 204 and 206** to accomplish migration of their search indexes.

As depicted, the example scenario 200 shows a stand-alone SE deployment 204 associated with a database **208*a*. The stand-alone SE deployment 204 can facilitate migration of its otherwise incompatible search index 210 to a cluster-based SE deployment 206 using tools that are native to the SE deployments. The cluster-based SE deployment 206 can use the migrated data of otherwise incompatible search index 210 to provide a search engine functionality for the database 208*a***.

The stand-alone SE deployment 204 can include a computing platform implemented by a SE computer program deployed on a stand-alone computing system 212, which in some examples can correspond to a computing device 104. The pair of dashed lines connecting the stand-alone computing system 212 and the stand-alone SE deployment 204 indicates that the stand-alone SE deployment is implemented on the stand-alone computing system.

The stand-alone computing system 212 of the stand-alone SE deployment 204 includes a computing system that operates independently of other physically or logically separate computing systems with regard to the SE application program deployed thereon. That said, the stand-alone computing system 212 can be physically and/or logically connected to other computing systems. However, the stand-alone computing system 212 operates independently of those connected systems with regard to the SE application program deployed thereon.

The stand-alone computer system 212 can be implemented by any computing system suitable in accordance with the technology described herein. Examples of a suitable computing system include (but is not limited to): a computer, a mobile device, a server, a tablet computer, a notebook computer, handheld computer, a workstation, a desktop computer, a laptop, a tablet, user equipment (UE), a network appliance, an e-reader, a wearable computer, a network node, a microcontroller, and a smartphone. A suitable computing system includes a computing device that is configured in a manner similar to how the stand-alone computing system 212 is described herein and is capable of performing the functionalities presented herein.

Herein, a computer program (i.e., "program") includes a collection of computer-executable instructions that, when executed by a computing system (such as the stand-alone computing system 212), direct the computing system to perform one or more operations. In some instances, a program may be described as including a set of processor-executable instructions that, when executed by one or more processors (such as those of the stand-alone computing system 212), direct the one or more processors to perform one or more operations. Such programs may be comprised of one or more sub-programs, modules, components, applications, and the like.

A SE application program (i.e., herein simply "search engine") can provide a mechanism to submit queries to find information related to the queries in one or more target data sources. Generally, a search engine has three primary functions: crawling, indexing, and ranking. When crawling, the search engine scours target data sources looking for content. When indexing, the search engine stores and organizes the found content into an index called a search index (SI). When ranking, the search engine uses the index to provide content that is relevant to a search query. The SI will be a topic of discussion herein.

Search engines are often placed into different categories: web, local, and enterprise. These categories can be distinguished based on the types of target data sources that are being searched by the search engine.

A web search engine can be designed to carry out a search over the World Wide Web in a systematic way for particular information specified in a search query. The World Wide Web (often simply called the "web") is an information system where documents and other web resources are identified by Uniform Resource Locators (URLs), which can be interlinked by hypertext, and are accessible over the Internet. GOOGLE™, BING™, BAIDU™, and YAHOO!™ are well-known examples of web search engines.

A local search engine can be designed to carry out a search of a constrained set of resources in a systematic way for particular information specified in a search query. The constrained set of resources may be limited topologically, logically, relationally, or physically. The limitation constraining the set of resources can be based on resources that meet the following example criteria: found on a stand-alone computing system, found on the "desktop" of a computing system, found on wired local area network (LAN), found on immediately connected computing systems, geographically limited, limited by political boundaries, and/or limited by other features.

An enterprise search engine can be designed to carry out a search of resources of one or more enterprises in a systematic way for particular information specified in a search query. An enterprise can include a company, corporation, organization, business, department, agency, university, college, and the like. In some examples, an enterprise can include a collection of enterprises. The resources of an enterprise can include, for example, databases, intranets, documents, files, file systems, document management systems, messages, messaging systems, etc.

In some examples, the search engine of the stand-alone SE deployment 204 can be categorized as a web search engine, a local search engine, an enterprise search engine, or a combination of multiple search engine categories. In some examples, the search engine of the stand-alone SE deployment 110 can be implemented as a stand-alone APACHE™ SOLR™ search engine deployable on a stand-alone server. APACHE™ SOLR™ is an open-source enterprise-search platform from the APACHE™ LUCENE™ project. The APACHE™ SOLR™ search engine takes in structured, semi-structured, and unstructured data from various sources, stores and indexes the data, and makes the data available for search.

The cluster-based SE deployment 206 includes a computing platform implemented by a search engine deployed on cluster-based computing systems 214, which in some examples can correspond to distributed computing resources 106 including computing device(s) 102. The pair of dashed lines connecting the cluster-based computing systems 214 and the cluster-based SE deployment 206 indicates that the cluster-based SE deployment is implemented on the cluster-based computing systems.

The cluster-based computing systems 214 include a set of loosely or tightly connected computing systems that can work together so that, in many aspects, they can be logically viewed as a single computing system. That is, the computing systems of the cluster-based computing systems 214 can operate together to function as though they were one computing system. Clusters of computing systems can improve performance and availability as compared to a single computing system while typically being much more cost-effective.

In some examples, the cluster-based computing systems 214 can be implemented by cloud-based computing systems. Cloud-based computing systems often provide on-demand availability of computer system resources, especially data storage (e.g., a database) and computing power, without direct active management by a user. The term "cloud-based" is generally used to describe data centers available to many users over the Internet. Large clouds, predominant today, often have functions distributed over multiple locations from central servers.

The cluster-based computing systems 214 of the cluster-based SE deployment 206 can include multiple interconnected and interoperable computing systems that operate together with regard to the search engine deployed thereon. The cluster-based computing systems 214 can be implemented by any computing system suitable in accordance with the technology described herein. The examples of a suitable computing system given above for the stand-alone computer system 212 can apply to the cluster-based computing systems 214 as well. Suitable computing systems include computing devices that are configured in a manner similar to how the cluster-based computing systems 214 is described herein and is capable of performing the functionalities presented herein.

In some examples, the search engine of the cluster-based SE deployment 206 can be categorized as a web search engine, a local search engine, an enterprise search engine, or a combination of multiple search engine categories. In some instances, the search engine of the cluster-based SE deployment 206 can be implemented as a cluster-based and/or cloud-based APACHE™ SOLR™ search engine deployable on cluster-based and/or cloud-based servers.

The target data sources can be including structured data, semi-structured, and/or unstructured data. In some examples, the search engine of the stand-alone SE deployment 204 and/or the cluster-based SE deployment 206 can target data sources that include structured data, semi-structured, and/or unstructured data.

Structured data is highly organized and formatted in a way, so the data is easily searchable in relational databases. Structured data is most often categorized as quantitative data. Structured data is the type of data that fits neatly within fixed fields and columns in relational databases and spreadsheets. Examples of structured data include names, dates, addresses, credit card numbers, stock information, geolocation, and more.

Unstructured data has no predefined format or organization. Thus, in comparison to structured data, it is much more time-consuming and costly to collect, process, and analyze unstructured data. Unstructured data is most often categorized as qualitative data. Unstructured data cannot be processed and analyzed using conventional computerized tools and methods. Examples of unstructured data include documents, text, video, audio, error logs, mobile activity, social media activity, satellite imagery, and surveillance imagery.

Database 208*a* is an example of a target data source of the stand-alone SE deployment 204. In other examples, the stand-alone SE deployment 204 can have one or more other target data sources and/or different types of target data sources (e.g., text documents). Database 208*b* is an example of a target data source of the cluster-based SE deployment 206. In other examples, the cluster-based SE deployment 206 can have one or more other target data sources and/or different types of target data sources (e.g., text documents).

An SE deployment can be on a computing platform that can include an instance of a search engine that is operable to execute on a host computing system or a collection of host computing systems. Thus, the stand-alone SE deployment 204 can include the search engine executing on the stand-alone computing system 212, and the cluster-based SE deployment 206 can include the search engine being operable to execute on the cluster-based computing systems 214.

As illustrated in example scenario 200, the stand-alone SE deployment 204 has an SI 210 for the database 208*a*. The relationship between the SI 210 and the database 208*a* is represented by double-arrow 216.

The SI 210 can include a body of structured data that the stand-alone SE deployment 204 can refer to when looking for results in the database 208*a* that are relevant to a specific query. The SI 210 can include information, such as metadata or keywords, that can allow the indexed data to be searched via the index instead of reading through each record in a data source individually.

The SI 210 can include structured data that indexes data found in the database 208*a*. The structured data can be stored in predefined declarative format for describing the structure of the data therein the SI 210. That declarative format is called a schema.

The schema can be an outline, diagram, or model. Schemas are often used to describe the structure of different types of data. Also, schemas provide a way to validate the data against their description. Two common examples of schemas include database schemas and XML (eXtensible Markup Language) schemas.

A database schema describes the tables and corresponding fields contained in a database. It may be displayed as a list of tables that each contain a sublist of fields along with the associated data type. An XML schema defines the elements that an XML file may contain. It provides a specific structure for XML data, which is important when sharing XML files between multiple systems.

The SI 210 is a data object (e.g., a file) that is generated by and read by the stand-alone SE deployment 204 in accordance with its predefined data-object format. This data-object format is the way that the stand-alone SE deployment 204 encodes information for storage and later decodes the same information.

As depicted in scenario 200, search indexes (or their backups) of the stand-alone SE deployment 204, for example, the SI 210, a SI backup 218*a* of that SI, and a SI backup copy 218*b* are search indexes (or backups) of the stand-alone SE deployment 204 as indicated by a folded corner on the upper right side.

Search indexes (or their backup) of the cluster-based SE deployment 206, for example, an SI 220, a backup 222 of that SI, and a restored SI 224, are search indexes of the cluster-based SE deployment 206 as indicated by a folded corner on the upper left side.

The document shapes with a dark shadow are backups of a SI. For example, the SI backup 218*a* is a backup of the SI of the stand-alone SE deployment 204, and the SI backup copy 218*b* is a duplicate of the SI backup 218*a*. However, as depicted, the SI backup copy 218*b* maintains its folded corner in the upper right side despite being located at the cluster-based SE deployment 206. The SI backup copy 218*b* was transferred from the stand-alone SE deployment 204 to the cluster-based SE deployment 206. Thus, the SI backup copy 218*b* maintains its association with the stand-alone SE deployment 204. Therefore, the SI backup copy 218*b* has the same data, schema, and defined data-object (e.g., file) format of the SI backup 218*a*. Thus, the SI backup copy 218*b* has the schema and defined data-object (e.g., file) format of the stand-alone SE deployment 204.

Some of the document shapes include X's that indicate that data populates the SI or its backup. For example, the SI 210, the SI backup 218*a*, and a copy of the SI backup copy 218*b* are populated with data. The search indexes with data populating them also have a schema and a defined data-object format.

Some of the document shapes are illustrated without any X's, which indicates that the SI (or its backup) is empty. That is, no data populates such search indexes or their backups. For example, the SI 220 and a backup 222 of that SI are empty. Although empty of data, the empty search indexes have a defined data-object format. The SI 220 is a data object (e.g., a file) that is generated by and read by the cluster-based SE deployment 206 in accordance with its predefined data-object format. This data-object format is the way that the cluster-based SE deployment 206 encodes information for storage and later decodes the same information.

In some examples, the data-object format of the SI 210 used by the stand-alone SE deployment 204 and the data-object format of a SI (such as the SI 220) of the cluster-based SE deployment 206 differ. In some examples, the schema of the SI 210 used by the stand-alone SE deployment 204 and the schema of the cluster-based SI differ.

Because of either or both of these differences, in some examples, the cluster-based SE deployment 206 does not operate when attempting to use the SI 210, and/or the stand-alone SE deployment 204 does not operate when attempting to use the cluster-based SI 220. In such examples, the search indexes are described as incompatible. More broadly, the two deployments may be described as being incompatible.

Without the technology described herein, data migration of the search indexes between the two incompatible deployments involves a special-purpose data-migration tool that handles the data, schema, and format conversion, or data migration of the search indexes between the two incompatible deployments involves manual process of data migration. However, migration 202 as described herein can utilize the native tools of the two incompatible deployments to accomplish the data migration of their search indexes.

The migration 202 can be implemented via one or more computer programs operable on a computing system, such as a stand-alone computing system 212, 104 and/or the cluster-based computing systems 214, 102. In some instances, the migration 202 can be implemented on a different computing system, but one that is operatively connected to the stand-alone computing system 212, 104 and/or the cluster-based computing systems 214, 102.

In some examples, the data migration described herein may involve migrating the data of the cluster-based SI of the cluster-based SE deployment 206 to the stand-alone SE deployment 204. In those instances, the cluster-based SE deployment 206 can be described as the first SE deployment, and the cluster-based SI 220 may be described as the first SI. Similarly, the other components, operations, and functions of the cluster-based SE deployment 206 may use the label "first."

In contrast, in those instances, the stand-alone SE deployment 204 can be described as the second SE deployment, and the SI 210 may be described as the second SI. Similarly, the other components, operations, and functions of the stand-alone SE deployment 110 may use the label "second."

In some examples, the data migration described herein can involve migrating the data of the SI 210 of the stand-alone SE deployment 204 to the cluster-based SE deployment 206. In those examples, the stand-alone SE deployment 204 can be described as the first SE deployment, and the SI 210 can be described as the first SI. Similarly, the other components, operations, and functions of the stand-alone SE deployment 204 can use the label "first."

In contrast, in those examples, the cluster-based SE deployment 206 can be described as the second SE deployment, and the cluster-based SI 220 can be described as the second SI. Similarly, the other components, operations, and functions of the cluster-based SE deployment 206 can use the label "second."

As shown in scenario 200, example operations of the migration 202 and the two deployments are described in the context of data migration of the SI 210 of the stand-alone SE deployment 204 to the cluster-based SE deployment 206. Thus, the stand-alone SE deployment 204 is the first SE deployment, and the cluster-based SE deployment 206 is the second SE deployment.

The example operations of the migration 202, as depicted, results in the restored SI 224. As indicated by the folded corner in the upper left corner of its document shape, the restored SI 224 is formatted in accordance with the cluster-based SE deployment 206. However, the restored SI 224 is populated with data and uses the schema of the SI 210. Consequently, the restored SI 224 of the cluster-based SE deployment 206 links to the database **208*b*. The relationship between the restored SI 224 and the database 208*b* is represented by double-arrow 226**.

The stand-alone SE deployment 204 can perform a backup operation using its backup tool 228. The cluster-based SE deployment 206 can perform a backup operation using its backup tool 230 and a restoration operation using its native restoration tool 232.

In some examples, the backup tools 228 and 230 and the restoration tool 232 of their respective deployments are native tools. That is, the tools and the operations of the tools are part of their deployment without modification.

Thus, for example, the backup tool 228 and its operations are part of the stand-alone SE deployment 204 and are not modified during the migration 202 or other aspects of the technology described herein. Also, for example, the backup tool 230, the restoration tool 232, and their operations are part of the cluster-based SE deployment 206 and are not modified during the migration 202 or other aspects of the technology described herein.

Herein, a backup (short for "data backup") operation can include a set of actions to generate a backup that stores data sources and data associated therewith. In so doing, the original data sources and their data associated therewith can be restored or recovered later. The backup operation is a special-purpose program designed to backup specific data sources and, in particular, deployments. Therefore, the backup operation stores all the specific data, schema, formats of the specific data sources that it cannot recreate later with the restoration. In addition, the backup operation stores other data and configuration settings that are associated with the specific data sources that it cannot recreate later with the restoration.

Herein, a restoration (short for "data restoration") operation can include a set of actions to restore or recover data sources and data associated therewith from a backup of such data sources and their associated data. In so doing, the original data sources and their data associated therewith are restored or recovered later. The restoration operation is a special-purpose program designed to restore specific data sources and, in particular, deployments. Therefore, based on the backup, the restoration operation restores and/or recreates all the specific data, schema, formats of the specific data sources. In addition, based on the backup, the restoration operation restores and/or recreates other data and configuration settings that are associated with the specific data sources.

As shown, migration 202 can include obtaining the SI 210 of the stand-alone SE deployment 204. For example, migration 202 can include production and presentation of a link to the data object (e.g., file) for the SI 210. With that link, the contents of the SI 210 can be made available for reading.

In some instances, the SI 210 of the stand-alone SE deployment 204 is incompatible with the cluster-based SE deployment 206. That is, the cluster-based SE deployment 206 can employ search indexes with different formats and/or schema than those of the stand-alone SE deployment 204.

Migration 202 can include determining the schema of data populating the SI 210. Migration 202 can include determining this based on a designation or indicator in the content of the SI 210. In some examples, migration 202 can include analyzing the structure and arrangement of the content of the SI 210 to determine its schema. The schema can be stored in a data object, such as a file.

Migration 202 can include transferring the schema to the cluster-based SE deployment 206. Migration 202 can include copying the data object of the schema to the cluster-based SE deployment 206. In some instances, migration 202 can direct the stand-alone SE deployment 204 to transfer the data object of the schema to the cluster-based SE deployment 206.

In some examples, migration 202 can include causing production of the stand-alone SI backup 218*a* by the backup tool 228 of the stand-alone SE deployment 204. Migration 202 can include causing this by sending commands or instructions to the stand-alone SE deployment 204 to perform a backup of the SI 210.

In some examples, migration 202 can include transferring the SI backup 218*a* to a single cluster-based computing system 214, computing device 102 of distributed computing resources 106 associated with the cluster-based SE deployment 206. SI backup copy 218*b* of the SI backup 218*a* is shown located with the cluster-based SE deployment 206. Arrow 234 indicates the transference.

In some examples, migration 202 can include initiating a duplication or transference of the SI backup copy 218*b* on the cluster-based SE deployment 206 from the cluster-based computing systems 214 to just one server of the multiple servers. In some instances, this may be described as duplication or transference of the SI backup copy 218*b* on multiple shards of the cluster-based SE deployment 206 to just one shard of the multiple shards.

This duplication or transference to one server or shard of the cluster-based SE deployment 206 can occur when the migration 202 is from the stand-alone SE deployment 204 to the cluster-based SE deployment 206.

In some instances, migration 202 can include causing the cluster-based SE deployment 206 to generate the SI 220 on the cluster-based SE deployment 206 including generating the SI 220 empty. The empty SI 220 contains no data but employs the schema of the SI 210 from the stand-alone SE deployment 204.

Using the empty SI 220, migration 202 can include causing the production of the empty SI backup 222 by the backup tool 230 of the cluster-based SE deployment 206.

Using the restoration tool 232 of the cluster-based SE deployment 206, migration 202 can include causing the creation of the restored SI 224 based on the SI backup copy 218*b* on the cluster-based SE deployment 206. In this example, the empty SI backup 222 is the target for the restoration operation of the restoration tool 232. With the empty SI backup 222 as the target and the SI backup copy 218*b* as the source, migration 202 can include causing the restoration tool 232 to create the restored SI 224.

As shown in scenario 200 and described above, migration 202 can include facilitating the data migration from the stand-alone SE deployment 204 to the cluster-based SE deployment 206. In some examples, the scenario 200 can include the source and target being reversed. That is, migration 202 can include facilitating data migration in the opposite direction—migration 202 can direct migration from the cluster-based SE deployment 206 to the stand-alone SE deployment 204.

Figure 3:
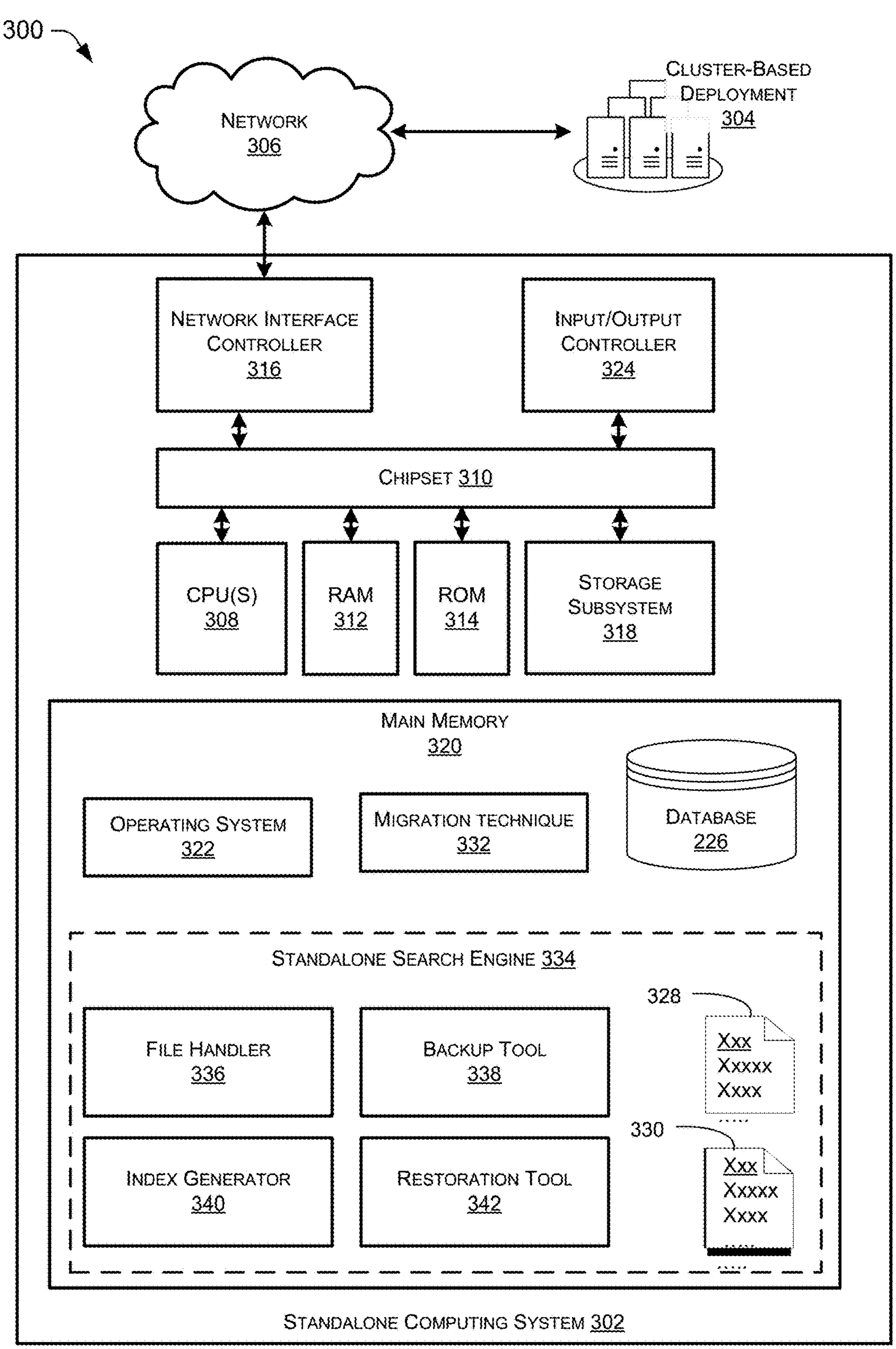
FIG. 3 shows an example of computer architecture for a computing system capable of executing the technology described herein.

FIG. 3 shows a configuration 300, which includes an example of computer architecture for a stand-alone computing system 302 that is suitable to perform operations in accordance with the technology described herein and, in some instances, corresponds to a computing device 104. Configuration 300 shows the stand-alone computing system 302 connected with a cluster-based deployment 304, which in some instances corresponds to distributed computing resources 106 made up of multiple computing systems, which in some instances, correspond to computing device(s) 102, via a network 306, which in some instances corresponds to network(s) 108.

The stand-alone computing system 302 can be implemented in a manner like the stand-alone computing system 212 described regarding FIG. 2. The cluster-based deployment 304 can include multiple computing systems like that of the stand-alone computing system 302. The cluster-based deployment 304 can be implemented in a manner like the cluster-based computing systems 214 of the cluster-based SE deployment 206 described in FIG. 2.

The stand-alone computing system 302 can include a baseboard, or "motherboard," a printed circuit board to which many components or devices can be connected by way of a system bus (not shown), which in some instances corresponds to bus 134 or other electrical communication paths. In one illustrative configuration, one or more central processing units ("CPUs") 308 operate in conjunction with a chipset 310. The CPUs 308 can be standard programmable processors that perform arithmetic and logical operations necessary for the operation of the stand-alone computing system 302.

The chipset 310 provides an interface between the CPUs 308 and the remainder of the components and devices on the baseboard. The chipset 310 can provide an interface to a RAM 312, used as the main memory in the stand-alone computing system 302. The chipset 310 can further provide an interface to a computer-readable storage medium such as ROM 314 or NVRAM to store basic routines that help to startup the stand-alone computing system 302 and transfer information between the various components devices. The ROM 314 or NVRAM can also store other software components necessary for the operation of the stand-alone computing system 302 in accordance with the configurations described herein.

The stand-alone computing system 302 can operate in a networked environment using logical connections to remote computing devices and computer systems through a network 306. The chipset 310 can include functionality for providing network connectivity through a network interface controller (NIC 316), such as a gigabit Ethernet adapter. The NIC 316 can connect the stand-alone computing system 302 to other computing devices over the network 306. It should be appreciated that multiple NICs 316 can be present in the stand-alone computing system 302, connecting the computer to other types of networks and remote computer systems.

The stand-alone computing system 302 can be connected to a storage subsystem 318 that provides non-volatile secondary storage for the computer. The storage subsystem 318 can store data, applications, and other executable components of the technology described herein. The storage subsystem 318 can be connected to the stand-alone computing system 302 through a storage controller (not shown) connected to the chipset 310. The storage subsystem 318 can include one or more physical storage units.

The main memory 320 may be part of the storage subsystem 318. The main memory 320 is a computer-readable storage medium for storing data, applications, and other executable components of the technology described herein. The main memory 320 is the primary memory or working memory of the stand-alone computing system 302.

In at least one example, the main memory 320 or other computer-readable storage media is encoded with computer-executable instructions which, when loaded into the stand-alone computing system 302, transform the computer from a general-purpose computing system into a special-purpose computer capable of implementing the embodiments described herein. These computer-executable instructions transform the stand-alone computing system 302 by specifying how the CPUs 308 transition between states.

According to at least one example, the stand-alone computing system 302 has access to computer-readable storage media storing computer-executable instructions that, when executed by the stand-alone computing system 302, perform the process described below regarding FIG. 4. The stand-alone computing system 302 can also include computer-readable storage media with instructions stored thereupon to perform any other computer-implemented operations described herein.

According to at least one example, main memory 320 stores an operating system 322, which can represent a LINUX operating system, a WINDOWS® SERVER operating system from MICROSOFT Corporation of Redmond, WA, a UNIX operating system or one of its variants. It should be appreciated that other operating systems can also be utilized.

The stand-alone computing system 302 can also include one or more input/output controllers 324 for receiving and processing input from several input devices. It will be appreciated that the stand-alone computing system 302 might not include all of the components shown in FIG. 3 and can include other components that are not explicitly shown in FIG. 3 or might utilize an architecture completely different than that shown in FIG. 3.

As depicted, the main memory 320 can include data such as database 326, SI 328, and SI backup 330. The main memory 320 also can include executable components to perform the functionality of a migration technique 332, which in some instances can correspond to migration 202 described herein. Moreover, the main memory 320 can include executable components the perform the functionality of a stand-alone search engine 334, which in some instances can correspond to the search engine of the stand-alone SE deployment 204 described herein. The executable components of the stand-alone search engine 334 can include a file handler component 336, a backup tool component 338, an index generator component 340, and a restoration tool component 342.

The migration technique 332 can cause operations to be performed by the stand-alone search engine 334 in accordance with the description herein and in accordance with process 400 of FIG. 4 described below. In addition, the migration technique 332 can cause operations to be performed by the cluster-based deployment 304 in accordance with the description herein and in accordance with process 400 of FIG. 4 described below. Furthermore, the migration technique 332 can cause processors to activate the native tools of two incompatible deployments to accomplish data migration of their respective search indexes in a similar manner as migration 202 described above.

The file handler component 336 can perform operations on files of the stand-alone search engine 334. Examples of such operations include copying, transferring, accessing, storing, and the like. The file handler component 336 can utilize the functionality of the operating system 322 to accomplish its operations.

The backup tool component 338 can generate a backup of source files and configurations (e.g., the SI 328) of the stand stand-alone search engine 334. The SI backup 330 is an example of a backup generated by the backup tool component 338.

The index generator component 340 can produce an SI for the stand-alone search engine 334. Without starting data, the index generator component 340 can produce an SI that is empty.

The restoration tool component 342 can generate a restoration of a SI backup of the stand-alone search engine 334. The SI backup 330 is an example of the source from which the restoration tool component 342 produces a restoration.

The SI 328 of the stand-alone search engine 334 is associated with the database 326. Database 326 is an example of a target data source in configuration 300. In other instances, a configuration 300 can have one or more other target data sources and, perhaps, different types of target data sources.

While not shown, the cluster-based deployment 304 can have similar components spread across multiple servers or shards. Examples of such similar components include a file handler component, a backup tool component, an index generator component, a restoration tool component, etc.

The migration technique 332 can obtain the SI 328 of the stand-alone search engine 334. For example, the migration technique 332 can link to the data object (e.g., file) for the SI 328. With that link, the migration technique 332 can read the contents of the SI 328. In some instances, the migration technique 332 can rely on the file handler component 336 to handle files and other data objects.

In some instances, the SI 328 of the stand-alone search engine 334 is incompatible with the cluster-based deployment 304. That is, the cluster-based deployment 304 employs search indexes with different formats and/or schema than those of the stand-alone search engine 334.

The migration technique 332 can determine the schema of data populating the SI 328. The migration technique 332 can determine this based on a designation or indicator in the content of the SI 328. In some instances, the migration technique 332 can analyze the structure and arrangement of the content of the SI 328 to determine its schema. The schema can be stored in a data object, such as a file.

The migration technique 332 can transfer the schema to the cluster-based deployment 304. The migration technique 332 can copy the data object of the schema to the cluster-based deployment 260 across the network 306. In some instances, the migration technique 332 can direct the stand-alone search engine 334 to transfer the data object of the schema to the cluster-based deployment 304.

In some instances, the migration technique 332 can cause the production of the SI backup 330 by the backup tool component 338 of the stand-alone search engine 230. The migration technique 332 can cause this by sending commands or instructions to the stand-alone search engine 334 to perform a backup of an SI, such as SI 328. In some instances, the migration technique 332 can transfer the SI backup 330 to the cluster-based deployment 304.

In some instances, the migration technique 332 can cause a cluster-based SE deployment 304, 206 to generate an empty SI on the cluster-based SE deployment 304, 206. The empty SI contains no data but employs the schema of the SI 328 from the stand-alone search engine 334 of the stand-alone computing system 302.

Using the empty SI, the migration technique 332 can cause the production of an empty SI backup by a backup tool component of the cluster-based deployment 304, 206. Using a restoration tool component of the cluster-based deployment 304, 206, the migration technique 332 can cause the creation of a restored SI based on the SI backup copy on one server or shard of the cluster-based deployment 304.

As shown in FIG. 3 and described above, the migration technique 332 can facilitate data migration from the stand-alone search engine 334 of the stand-alone computing system 302 to the cluster-based deployment 304. Instead of what is depicted in FIG. 3, a migration technique 332 can facilitate data migration in the opposite direction. That is, a migration technique 332 can direct migration from the cluster-based deployment 304 to the stand-alone computing system 302. In some instances, the migration technique 332 can be controlled by component(s) located on the cluster-based deployment.

Figure 4:
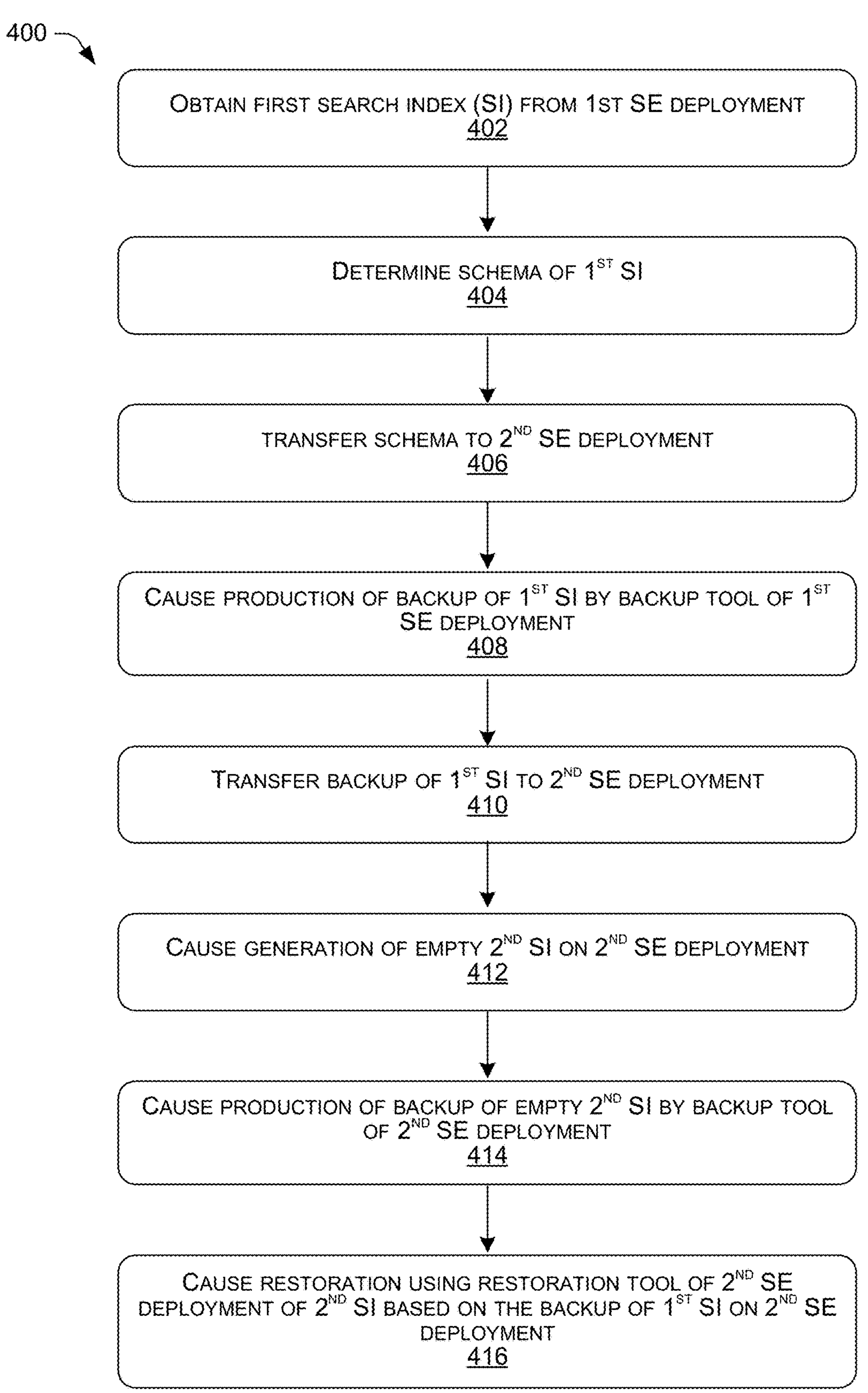
FIG. 4 is a flowchart illustrating a process to facilitate a data migration approach to transfer data across incompatible search indexes of differing search-engine deployments, according to the technology described herein.

FIG. 4 is a flowchart illustrating an example process 400 to facilitate a data migration approach to transfer data across incompatible search indexes of SE deployments, according to the technology described herein. For ease of discussion, a "system" is described as performing the operations of the example process 400 herein.

At 402, the system obtains a first SI of a first SE deployment. In some instances, the first SE deployment is a stand-alone SE deployment, such as the stand-alone SE deployment 204 of a stand-alone computing system 212, 302. Thus, the first SI can represent, for example, SI 210 or SI 328. Thus, the first SE deployment can include a stand-alone-deployed search engine (e.g., stand-alone search engine 334) deployed on a stand-alone server and the second SE deployment can include a cluster-based search engine deployed on a cluster 106, 214, 304 of multiple servers 102 that are interconnected and interoperational over a communications network, such as network 108, 306.

For example, the first SE deployment can include a stand-alone APACHE™ SOLR™ search engine deployable on a stand-alone server and the second SE deployment includes a cluster-based APACHE™ SOLR™ search engine deployable on a cluster of multiple servers that are interconnected and interoperational over the communications network.

In some instances, the first SE deployment is a cluster-based SE deployment, such as cluster-based SE deployment 206 or cluster-based deployment 304. Thus, the first SE deployment can include a cluster-based search engine deployed on a cluster of multiple servers that are interconnected and interoperational over the communications network and the second SE deployment can include a stand-alone search engine deployed on a stand-alone server.

For example, the first SE deployment may include a cluster-based APACHE™ SOLR™ search engine deployable on a cluster of multiple servers that are interconnected and interoperational over the communications network and the second SE deployment may include a stand-alone APACHE™ SOLR™ search engine deployable on a stand-alone server.

At 404, the system determines the schema of the data populating the first SI. In some instances, the information about the schema can be acquired from the first SE deployment itself. In other instances, the system can analyze the first SI to extract and/or determine the information about the schema.

At 406, with the information about the schema, the system transfers the schema to the second SE deployment. In some instances, the second SE deployment is the cluster-based SE deployment, such as the cluster-based SE deployment 206 or the cluster-based deployment 304. In some instances, the first SE deployment is the stand-alone SE deployment on a stand-alone server, such as the stand-alone SE deployment 204 on stand-alone server 212 or the stand-alone server 302.

In some instances, the first SI is incompatible with the second SE deployment and the second SI is incompatible with the first SE deployment. In some instances, the data-object format of the first SI of the first SE deployment and the data-object format of search indexes of the second SE deployment differ. In some instances, the schema of the first SI of the first SE deployment and the schema of the second SI differ. Because of either or both of these differences, in some of those instances, the second SE deployment might not operate when using the first SI, and/or the first SE deployment might not operate when using the second SI. In such instances, the search indexes are described as incompatible. More broadly, the first and second deployments may be described as being incompatible.

At 408, the system causes the production of a backup of the first SI. For example, the system can direct a native backup tool of the stand-alone SE deployment 204 to generate a SI backup of the SI 210. In at least one example, a native backup tool, e.g., backup tool 228, of the stand-alone SE deployment 204 can generate a SI backup **218*a* from the SI 210** using APACHE™ SOLR™ replication handler, e.g., solr.ReplicationHandler or a replication backup command such as http://localhost:8983/solr/getting-started/replication?command=backup.

At 410, the system transfers the search-index backup of the first SI to the second SE deployment. For example, to a single server of a cluster-based SE deployment, such as the cluster-based SE deployment 206 or the cluster-based deployment 304. In at least one example, transference e.g., transference 234 of an SI backup copy, e.g., **218*a*, from stand-alone computing system 212 to a single server or shard of the cluster-based SE deployment, e.g., 206/304, as SI backup copy 218*b*** can be accomplished using a command such as scp, winscp, etc.

At 412, the system causes the generation of an empty second SI on the second SE deployment. The empty second SI can employ the schema of the first SI using the APACHE™ SOLR™ Collections API, which enables a number of commands Collections for the cluster-based computing systems 214 such as/admin/collections?action=CREATE&name=name. For example, Collections API can include commands for creating a Collection, modifying attributes of a Collection, reloading a Collection, splitting a shard, creating a shard, deleting a shard, creating or modifying an alias of a Collection, deleting an alias of a Collection, listing the aliases, e.g., all aliases, in a cluster, deleting a Collection, deleting a replica, providing cluster properties, migrating documents to another Collection, adding a role, removing a role, providing overseer status and statistics, providing cluster status, requesting status of an Async call, deleting status, providing a list of Collections, adding replica property, deleting replica property, balancing a property across nodes, rebalancing leaders, forcing a shard leader, migrating a cluster state, backing up a collection, restoring a collection, deleting a replica in a node, moving replicas in a node to another node, moving a replica to a new node, and/or making asynchronous calls. In at least one example, to ensure the schema of the empty second SI is the same as the schema of the first SI, fields and types that are the same can be used and/or an xml file that holds the schema of the first SE deployment 204 can be used to create the schema for the second SE deployment 206.

At 414, the system causes the production of a backup of the empty second SI. For example, the system can direct a backup tool of the second SE deployment to generate a SI backup of the second SI. The SI backup contains no data. Thus, the SI backup is empty. In at least one example, a native backup tool, e.g., backup tool 230, of the cluster-based SE deployment 206 can generate a SI backup 222 from the SI 220 using one or more commands from the APACHE™ SOLR™ Collections API such as/admin/collections?action=BACKUP&name=myBackupName&collection=myCollectionName&location=/path/to/my/shared/drive.

At 416, the system causes the restoration of the second SI based on the backup of the first SI on the second SE deployment. For example, the system may direct a restoration tool of the second SE deployment to generate a restored SI using both the empty second SI and the SI backup of the first SI. In at least one example, a native restoration tool, e.g., restoration tool 232 of the cluster-based SE deployment 206 can be used to restore data, such as from backup 218*b*, by copying data from the backup directory into a shard, such as path/to/my/shared/drive/collection/snapshot.shardn, where n is any integer greater than and/or equal to 1. Restore tool 232 creates restored SI 224 having the schema of the second SE deployment 206 and ensures that data in the table is accessible via the Collections API via a command such as /admin/collections?action=RESTORE&name=myBackupName&location=/path/to/my/shared/drive&collection=myRestoredCollectionName.

Thus, the first search-engine deployment and the second search-engine deployment are associated with a common database. With this restored SI, the second SE deployment may provide searching services to a database that was originally serviced by the first SE deployment.

With the techniques described herein, an inventory of objects in an environment can be more easily and accurately created, such as for use in documenting an insurance claim. Furthermore, changes to objects in an environment can be more accurately determined, which can, for example, assist policyholders in preparing and/or documenting an insurance claim after an incident.

CONCLUSION

Although the techniques have been described in language specific to structural features and/or methodological acts, it is to be understood that the appended claims are not necessarily limited to the features and/or acts described. Rather, the features and acts are described as example implementations of such techniques. For example, network 108, processing unit(s) 112/130/308, and other structures described herein for which multiple types of implementing devices or structures are listed can include any of the listed types, and/or multiples and/or combinations thereof.

The operations of the example processes are illustrated in individual blocks and summarized with reference to those blocks. The processes are illustrated as logical flows of blocks, each block of which can represent one or more operations that can be implemented in hardware, software, and/or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that can configure a processor to perform particular functions and/or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 102, 104, 212, and/or 302 such as one or more internal and/or external CPUs and/or GPUs, and/or one or more pieces of hardware logic such as FPGAs, DSPs, and/or other types described above.

All of the methods and processes described above can be embodied in, and fully automated via, software code modules executed by one or more general-purpose computer(s) and/or processor(s) thereby reconfiguring the general-purpose computer(s) and/or processor(s) as special purpose computer(s) and/or processor(s) during their execution. The code modules can be stored in any type of computer-readable storage medium and/or other computer storage device. Some and/or all of the methods can be embodied in specialized computer hardware.

Conditional language such as, among others, "can," "could," "might" and/or "may," unless specifically stated otherwise, are understood within the context to present that certain examples include, while other examples need not include, certain features, elements and/or steps. Thus, such conditional language is not generally intended to imply that certain features, elements and/or steps are in any way required for one or more examples and/or that one or more examples necessarily include logic for deciding, with and/or without user input and/or prompting, whether certain features, elements and/or steps are included and/or are to be performed in any particular example. The word "or" is used herein in an inclusive sense unless specifically stated otherwise. Accordingly, conjunctive language such as the phrases "X, Y, or Z" or "at least one of X, Y or Z," unless specifically stated otherwise, is to be understood as signifying that an item, term, etc., can be either X, Y, or Z, or any combination thereof.

Any routine descriptions, elements and/or blocks in the flow diagrams described herein and/or depicted in the attached figures should be understood as potentially representing modules, segments, and/or portions of code that include one or more executable instructions for implementing specific logical functions and/or elements in the routine. Alternative implementations are included within the scope of the examples described herein in which elements and/or functions can be deleted and/or executed out of order from any order shown or discussed, including substantially synchronously and/or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim or clause is a reference to at least some and not necessarily all of the items in the group of items, unless specifically stated otherwise.

I claim:

1. A computer-implemented method for data migration of search indexes between incompatible search engine deployments, comprising:

obtaining a first search index associated with a stand-alone search engine deployment deployed on a stand-alone server, wherein the stand-alone search engine deployment:

uses the first search index to provide, in response to a search query, search results from an external database, and includes a first backup tool deployed on the stand-alone server;

determining an incompatibility condition of the stand-alone search engine deployment with a cluster-based search engine deployment that is deployed on a cluster of multiple servers, wherein determining the incompatibility condition comprises determining that at least one of:

a first file format of the first search index and a second file format of a second search index, associated with the cluster-based search engine deployment, differ, or a first schema of the first search index and a second schema of the second search index differ; and based on determining the incompatibility condition:

generating, by the first backup tool, a first backup of the first search index on the stand-alone server;

transferring the first backup from the stand-alone server to the cluster-based search engine deployment;

generating, by a second backup tool, different from the first backup tool, associated with the cluster-based search engine deployment, a target search index, wherein:

the target search index is empty and is characterized by the first file format or the first schema, and the second backup tool is deployed on the cluster of multiple servers; and creating, by a restoration tool associated with the cluster-based search engine deployment, and using the transferred first backup on the cluster-based search engine deployment as a source search index, a restored search index operable on the cluster of multiple servers.

2. The computer-implemented method of claim 1 further comprising:

determining the first schema of the first search index; and transferring the first schema to the cluster-based search engine deployment, wherein the target search index employs the first schema.

3. The computer-implemented method of claim 1, wherein the cluster of multiple servers is interconnected and inter-operational over a communications network, the method further comprising:

initiating a copy of the first backup of the first search index to one server of the cluster of multiple servers.

4. The computer-implemented method of claim 1, wherein;

the stand-alone search engine deployment comprises a stand-alone APACHE™ SOLR™ search engine deployment deployable on the stand-alone server, and the cluster-based search engine deployment comprises a cluster-based APACHE™ SOLR™ search engine deployment deployable on the cluster of multiple servers that are interconnected and inter-operational over a communications network.

5. A system for data migration of search indexes between incompatible search engine deployments, comprising:

one or more processors; and a computer-readable medium coupled to the one or more processors, the computer-readable medium storing instructions that are executable by the one or more processors to perform operations including:

obtaining a first search index associated with a stand-alone search engine deployment deployed on a stand-alone server, wherein the stand-alone search engine deployment:

uses the first search index to provide, in response to a search query, search results from an external database, and includes a first backup tool deployed on the stand-alone server;

determining an incompatibility condition of the stand-alone search engine deployment with a cluster-based search engine deployment, wherein determining the incompatibility condition comprises determining that at least one of:

a first file format of the first search index and a second file format of a second search index, associated with the cluster-based search engine deployment, differ, or a first schema of the first search index and a second schema of the second search index differ; and based on determining the incompatibility condition:

generating, by the first backup tool, a first backup of the first search index on the stand-alone server;

transferring the first backup from the stand-alone server to the cluster-based search engine deployment deployed on a cluster of multiple servers;

generating, by a second backup tool, different from the first backup tool, of the cluster-based search engine deployment, a target search index, wherein:

the target search index is empty and is characterized by the first file format or the first schema, and the second backup tool is deployed on the cluster of multiple servers; and creating, by a restoration tool of the cluster-based search engine deployment, and using the transferred first backup on the cluster-based search engine deployment as a source search index, a restored search index operable on the cluster of multiple servers.

6. The system of claim 5, wherein the operations further comprise:

determining the first schema of the first search index; and transferring the first schema of the first search index to the cluster-based search engine deployment, wherein the restored search index is generated on the cluster-based search engine deployment using the first schema.

7. The system of claim 5, wherein the cluster of multiple servers is interconnected and inter-operational over a communications network, and the operations further comprise;

initiating a copy of the first backup of the first search index to an individual server of the cluster of multiple servers on which the cluster-based search engine deployment is deployed.

8. The system of claim 5, wherein;

the stand-alone search engine deployment comprises a stand-alone APACHE™ SOLR™ search engine deployment deployable on the stand-alone server, and the cluster-based search engine deployment includes a cluster-based APACHE™ SOLR™ search engine deployment deployable on the cluster of multiple servers that are interconnected and inter-operational over a communications network.

9. The system of claim 5, wherein the stand-alone search engine deployment and the cluster-based search engine deployment are associated with a common database.

10. One or more non-transitory computer-readable media storing instructions that, when executed by one or more processors of at least one device, configure the at least one device to perform operations, the operations comprising:

obtaining a first search index associated with a cluster-based search engine deployment deployed on a cluster of multiple servers, wherein the cluster-based search engine deployment:
uses the first search index to provide, in response to a search query, search results from an external database, and
includes a first backup tool deployed on the cluster of multiple servers;
determining an incompatibility condition of the cluster-based search engine deployment with a stand-alone search engine deployment deployed on a stand-alone server, wherein determining the incompatibility condition comprises determining that at least one of:
a first file format of the first search index and a second file format of a second search index, associated with the stand-alone search engine deployment, differ, or
a first schema of the first search index and a second schema of the second search index differ; and
based on determining the incompatibility condition:
generating, by the first backup tool, a first backup of the first search index on the cluster of multiple servers;
transferring the first backup from the cluster of multiple servers to the stand-alone search engine deployment;
generating, by a second backup tool, different from the first backup tool, associated with the stand-alone search engine deployment, a target search index, wherein:
the target search index is empty and is characterized by the first file format or the first schema, and
the second backup tool is deployed on the stand-alone server; and
creating, by a restoration tool associated with the stand-alone search engine deployment and using the transferred first backup on the stand-alone search engine deployment as a source search index, a restored search index operable on the stand-alone server.

11. The one or more non-transitory computer-readable media of claim 10, wherein the cluster of multiple servers are interconnected and inter-operational over a communications network.

12. The one or more non-transitory computer-readable media of claim 10, wherein the cluster-based search engine deployment and the stand-alone search engine deployment are associated with a common database.

13. The computer-implemented method of claim 1, wherein the first schema of the first search index is different from the second schema of the second search index.

14. The computer-implemented method of claim 1, wherein a search engine of the cluster-based search engine deployment comprises a combination of two or more of a local search engine, a web search engine, or an enterprise search engine.

15. The one or more non-transitory computer-readable media of claim 10, wherein:
the stand-alone search engine deployment comprises a stand-alone APACHE™ SOLR™ search engine deployment deployable on the stand-alone server, and
the cluster-based search engine deployment comprises a cluster-based APACHE™ SOLR™ search engine deployment deployable on the cluster of multiple servers that are interconnected and inter-operational over a communications network.

16. The computer-implemented method of claim 1, wherein;
the restoration tool is a native restoration tool of the cluster-based search engine deployment,
creating the restored search index comprises using the native restoration tool to restore data from the transferred first backup, and
the native restoration tool copies the data from multiple shards of the cluster-based search engine deployment to a single shard of the multiple shards.

17. The computer-implemented method of claim 16, wherein a name of a file location of an individual shard ends with an integer greater than or equal to 1.

18. The computer-implemented method of claim 1, wherein the cluster-based search engine deployment includes one or more of a file handler, the second backup tool, an index generator, or the restoration tool spread across multiple shards.

19. The system of claim 5, wherein a search engine of the cluster-based search engine deployment comprises a local search engine, a web search engine, or an enterprise search engine.

20. The system of claim 5, wherein:
the restoration tool is a native restoration tool of the cluster-based search engine deployment, and
creating the restored search index comprises using the native restoration tool to restore data from the transferred first backup.

* * * * *